(12) United States Patent
Park et al.

(10) Patent No.: US 11,817,767 B2
(45) Date of Patent: Nov. 14, 2023

(54) CONTROL POWER FOR SUBMODULES OF A MMC CONVERTER

(71) Applicant: HYOSUNG HEAVY INDUSTRIES CORPORATION, Seoul (KR)

(72) Inventors: Yong Hee Park, Anyang-si (KR); Sung Min Oh, Seoul (KR); Doo Young Lee, Anyang-si (KR); Hong Ju Jung, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 230 days.

(21) Appl. No.: 17/420,301

(22) PCT Filed: Dec. 30, 2019

(86) PCT No.: PCT/KR2019/018746
§ 371 (c)(1),
(2) Date: Jul. 1, 2021

(87) PCT Pub. No.: WO2020/141838
PCT Pub. Date: Jul. 9, 2020

(65) Prior Publication Data
US 2022/0094279 A1 Mar. 24, 2022

(30) Foreign Application Priority Data
Jan. 2, 2019 (KR) .......... 10-2019-0000120

(51) Int. Cl.
*H02M 7/483* (2007.01)
*H02M 1/00* (2006.01)

(52) U.S. Cl.
CPC ....... *H02M 1/0006* (2021.05); *H02M 7/4835* (2021.05)

(58) Field of Classification Search
CPC .................................................. H02M 1/0006
See application file for complete search history.

(56) References Cited

U.S. PATENT DOCUMENTS 5,821,771 A * 10/1998 Patel .................. H03K 19/1778
326/38
2021/0257915 A1* 8/2021 Ishii ...................... H02M 1/096

FOREIGN PATENT DOCUMENTS

KR 10-2016-0080018 A 7/2016
KR 10-2016-0080019 A 7/2016
(Continued)

*Primary Examiner* — Peter M Novak
(74) *Attorney, Agent, or Firm* — NKL Law; Jae Youn Kim

(57) ABSTRACT

Proposed is a submodule of an MMC converter configured to stably supply power to a submodule controller controlling the submodule of an MMC converter. The submodule includes: an energy storage part storing electric energy therein; a plurality of switching elements connected in parallel to the energy storage part to have a shape of a bridge; a plurality of serially-connected resistors connected in parallel to the energy storage part; a plurality of DC-DC converters connected in parallel to a resistor of the plurality of resistors; a power switching part operating to select and output one voltage of voltages output from the plurality of DC-DC converters and a plurality of voltages input from outside; and a submodule controller operating with the voltage output by the power switching part so as to control switching operations of the plurality of switching elements.

4 Claims, 3 Drawing Sheets

(56) References Cited

FOREIGN PATENT DOCUMENTS

| KR | 10-1723094 B1 | 4/2017 |
|----|---------------|--------|
| KR | 10-1758301 B1 | 7/2017 |
| KR | 101758301 B1 | 7/2017 |
| KR | 10-1780265 B1 | 9/2017 |
| KR | 10-2018-0075340 A | 7/2018 |
| KR | 20180075340 A | 7/2018 |

* cited by examiner

CONTROL POWER FOR SUBMODULES OF A MMC CONVERTER

TECHNICAL FIELD

The present disclosure relates generally to a submodule of a modular multilevel converter (MMC). More particularly, the present disclosure relates to a submodule of an MMC converter configured to stably supply power to a submodule controller controlling the submodule of an MMC converter.

BACKGROUND ART

As is known, a modular multilevel converter (MMC) may connect to a high voltage direct current (HVDC) transmission system for power transmission and reactive power compensation. The MMC converter includes a plurality of submodules connected to each other in series.

In the MMC converter, a submodule is a very important component and is controlled by a submodule controller installed in the submodule. Generally, high voltage generated in the submodule provides power to the submodule controller.

In this case, in order to use the high voltage of the submodule as the power of the submodule controller, a power device which converts the high voltage into a low voltage required for the submodule controller is required.

FIG. 1 is a configuration diagram of a submodule of a conventional MMC converter. The submodule 10 includes a bridge circuit including a plurality of switches 11 and 12 and a capacitor 13. In FIG. 1, a half-bridge circuit is illustrated, but a full-bridge circuit may be applied to the submodule.

The submodule 10 is controlled by the submodule controller 16 installed therein. The submodule controller 16 uses a high voltage, which is charged in the capacitor 13. That is, in the submodule 10, the high voltage input through terminals X1 and X2 is charged in the capacitor 13, and the charged voltage is divided by a plurality of resistors R1 and R2. In a DC-DC converter 15, the divided voltage is converted to a voltage required for the submodule controller 16, and the converted voltage is supplied to the submodule controller 16. Accordingly, the submodule controller 16 is operated by the supplied voltage and performs the switching of the switches 11 and 12.

Accordingly, to supply a voltage to the submodule controller 16, the submodule 10 of a conventional MMC converter is required to have the DC-DC converter 15 which converts a high voltage of several to tens of kV stored in the submodule 10 into a low voltage of several to tens of V required for the submodule controller 16.

However, when an overvoltage is applied to the submodule storing the high voltage of several to tens of kV, there is a problem in that the range of a voltage input to the DC-DC converter 15 is exceeded and malfunctions. To solve this, the input voltage specification of the DC-DC converter 15 is required to be increased. In order to consider the occurrence range of the overvoltage, a DC-DC converter 15 having a specification higher than necessary is applied, which increases cost of the submodule.

In addition, when the DC-DC converter malfunctions, it is impossible to supply a voltage required for the submodule controller 16, so the submodule 10 does not operate properly.

DISCLOSURE

Technical Problem

Accordingly, the present disclosure is intended to propose a submodule of an MMC converter configured to stably supply a voltage required for a submodule controller installed in the submodule applied to the MMC converter.

In addition, the present disclosure is intended to propose a submodule of an MMC converter in which although a failure occurs in a DC-DC converter when supplying a voltage to the submodule controller of the submodule applied to the MMC converter, the voltage may be supplied to the submodule controller.

Furthermore, the present disclosure is intended to propose a submodule of an MMC converter in which although a voltage is not applied to the MMC converter system, a voltage can be supplied to the submodule controller of the submodule.

Technical Solution

A submodule of an MMC converter according to an embodiment of the present disclosure includes: an energy storage part storing electric energy therein; a plurality of switching elements connected in parallel to the energy storage part to have a shape of a bridge; a plurality of serially-connected resistors connected in parallel to the energy storage part; a plurality of DC-DC converters connected in parallel to a resistor of the plurality of resistors; a power switching part operating to select and output one voltage of voltages output from the plurality of DC-DC converters and a plurality of voltages input from outside; and a submodule controller operating with the voltage output by the power switching part so as to control switching operations of the plurality of switching elements.

In the present disclosure, the power switching part may select one voltage of the voltages output from the plurality of DC-DC converters and the plurality of voltages input from the outside according to a preset priority and may output the selected voltage to the submodule controller.

In the present disclosure, at least one charging cell may be connected to the submodule controller by a charging cell switch such that the charging cell and the submodule controller are electrically connected to each other, and the submodule controller may include a voltage detection part detecting the voltage supplied from the power switching part, wherein when the voltage detected by the voltage detection part is less than a preset voltage, the submodule controller may turn on the charging cell switch such that a voltage charged in the charging cell is supplied to the submodule controller.

In the present disclosure, one DC-DC converter of the plurality of DC-DC converters may be selected and a voltage output from the selected DC-DC converter may be output to the power switching part.

In the present disclosure, after checking the voltages of the plurality of DC-DC converters, one DC-DC converter having a voltage closest to a voltage required for the submodule controller may be selected, and the voltage of the selected DC-DC converter may be output to the power switching part.

Advantageous Effects

According to the present disclosure, although the submodule of an MMC converter is not provided with a high-spec DC-DC converter, a voltage can be stably supplied to a submodule controller.

According to the present disclosure, even if the DC-DC converter in the submodule of an MMC converter malfunctions, there is no problem in the operation of the submodule controller.

According to the present disclosure, even if a voltage is not applied to the MMC converter system, the submodule controller can be operated, thereby taking action by monitoring the abnormal state of the submodule in advance even in the non-operation state of the submodule.

MODE FOR INVENTION

Figure 1:
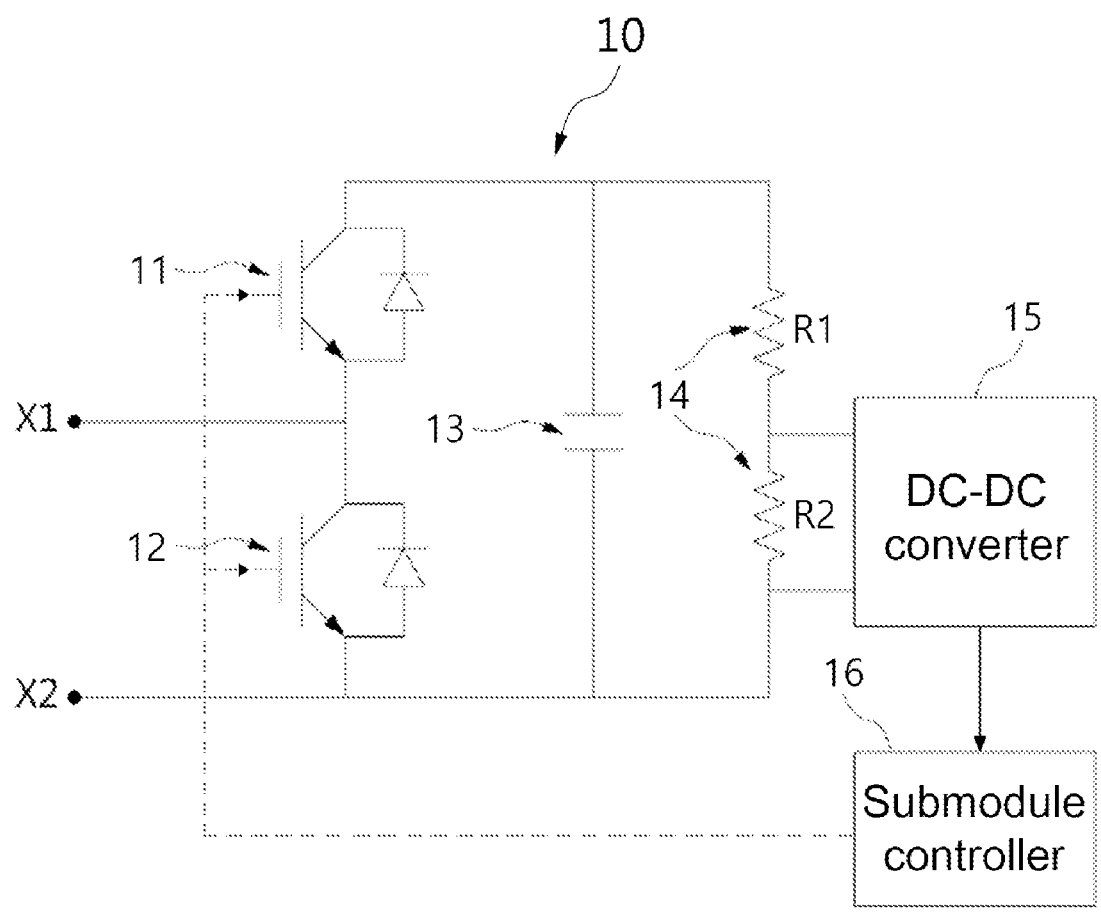
FIG. 1 is a configuration diagram of a submodule of a conventional MMC converter.

Hereinafter, embodiments of the present disclosure will be described in detail with reference to the accompanying drawings. In giving reference numerals to components of each drawing, it should be noted that the same components are given the same reference numerals as many as possible although they are indicated on different drawings. In addition, in describing the embodiments of the present disclosure, if it is determined that a detailed description of a related known configuration or function interferes with the understanding of the embodiments of the present disclosure, the detailed description thereof will be omitted.

In addition, in describing the components of an actuator of the present disclosure according to the embodiments, terms such as first, second, A, B, (a), (b), etc. may be used. These terms are only for distinguishing the components from other components, and the essence or order of the components are not limited by the terms. When it is described that a component is "connected", "coupled", or "bonded" to another component, it should be understood that the component may be directly connected or bonded to the other component, but another component may be provided between each component to be connected or bonded thereto.

Figure 2:
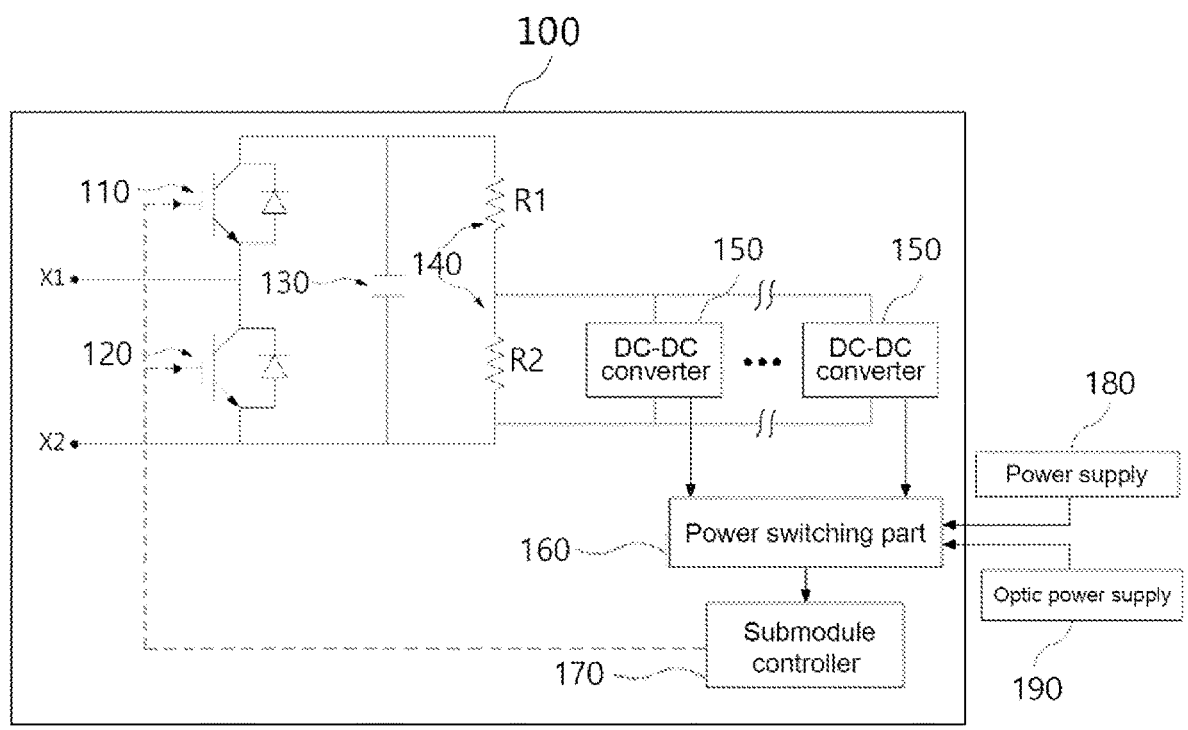
FIG. 2 is a configuration diagram of a submodule of an MMC converter according to an embodiment of the present disclosure.

FIG. 2 is a configuration diagram of a submodule of an MMC converter according to the embodiment of the present disclosure.

Referring to FIG. 2, the submodule 100 according to the embodiment of the present disclosure may include a plurality of switching elements 110 and 120, an energy storage part 130, a plurality of resistors 140, a plurality of DC-DC converters 150, a power switching part 160, and a submodule controller 170.

The switching elements 110 and 120 and the energy storage part 130 may constitute a bridge circuit. Such a bridge circuit, for example, may be configured as a half-bridge circuit or a full-bridge circuit.

The plurality of switching elements 110 and 120 may switch voltages input to the submodule 100 through terminals X1 and X2 such that the switched voltages are charged in the energy storage part 130. For example, each of the plurality of switching elements 110 and 120 may be configured as a semiconductor switch for power, and the energy storage part 130 may store electric energy. For example, the energy storage part 130 may store electric charges. The switching operation of each of the switching elements 110 and 120 may be controlled by the submodule controller 170. In the drawing, for example, a half-bridge circuit is illustrated, but a full-bridge circuit may be applied to the submodule of the actuator of the present disclosure.

For example, the switching elements 110 and 120 may include an IGBT, a FET, and a transistor, etc. and the energy storage part 130 may be, for example, a capacitor.

The plurality of resistors 140 may be connected in series with each other. The resistors 140 connected in series may be connected in parallel to the energy storage part 130. Accordingly, a voltage corresponding to electric energy stored in the energy storage part 130 may be divided by the plurality of resistors 140.

The DC-DC converters 150 may be connected in parallel to a resistor R2 of the plurality of resistors 140 and the divided voltage applied to the opposite ends of the resistor R2 may be input to the DC-DC converters 150. In this case, the plurality of DC-DC converters 150 may be connected in parallel with each other. Each of the DC-DC converters 150 may convert the divided voltage into a voltage required for the operation of the submodule controller 170 and may output the converted voltage.

In this case, according to another embodiment of the present disclosure, the output of the voltage of each of the DC-DC converters 150 may be controlled by a preset controller (not shown). That is, each of the DC-DC converters 150 connected in parallel with each other may convert a voltage applied to the opposite ends of the resistor R2 into a voltage required for the submodule controller 170 and may output the converted voltage to the power switching part 160. The output of the converted voltage may be controlled by the controller. The controller may determine which of the plurality of DC-DC converters outputs the voltage to the power switching part 160. To this end, the controller may check the output voltages of the DC-DC converters 150, and may select a DC-DC converter having a voltage closest to a voltage required for the submodule controller 170, and may control the outputting of the voltage of the selected DC-DC converter to the power switching part 160.

The power switching part 160 may selectively switch a voltage output from each of the plurality of DC-DC converters 150 such that the switched voltage is output to the submodule controller 170. Accordingly, one voltage of the voltages output from the plurality of DC-DC converters 150 may be transmitted to the submodule controller 170.

The submodule controller 170 may fundamentally receive a voltage required for the operation thereof and may control the switching of the plurality of switching elements 110 and 120. To this end, the submodule controller 170 may receive a voltage output from the power switching part 160 and may operate.

Accordingly, in the submodule 100 according to the embodiment of the present disclosure, voltages output from the plurality of DC-DC converters 150 may be selectively supplied to the submodule controller 170, so even if any one converter of the plurality of DC-DC converters 150 malfunctions, a voltage may be continuously supplied to the submodule controller 170.

Meanwhile, in the submodule 100 according to the another embodiment of the present disclosure, the power switching part 160 may receive a voltage from a plurality of different power supplies 180 or 190 located at the outside and may selectively transmit the voltage to the submodule controller 170 through the switching operation of the power switching part. In this case, for example, as the plurality of external different power supplies, a normal switched mode power supply (SMPS) 180 which converts an AC voltage to a DC voltage by using a switching transistor and outputs the DC voltage may be used, or a known optic power supply 190 which converts light energy to electric energy by using an optical device and outputs the electric energy may be used. Of course, the normal switched mode power supply (SMPS) 180 and the known optic power supply 190 may both be used. According to the another embodiment of the present disclosure, all of the known power supply 180 and optic power supply 190 described above may be used, but in still another embodiment, one of the power supply 180 and the optic power supply 190 may be used.

Accordingly, according to the another embodiment of the present disclosure, the power switching part 160 may internally perform a switching operation to selectively supply a voltage output from each of a plurality of devices, which are the plurality of DC-DC converters 150, the external power supply 180, and/or from the external optic power supply 190, to the submodule controller 170. Accordingly, the submodule controller 170 may receive one voltage of voltages output from the plurality of devices 150, 180, and 190, so in the case that any one device of the plurality of devices malfunctions, it is possible to stably supply a voltage to the submodule controller 170.

The power switching part 160 may transmit each voltage output from the plurality of DC-DC converters 150, the power supply 180, and/or the optic power supply 190 to the submodule controller 170 according to a preset priority. For example, when the power switching part 160 receives a voltage from each of the DC-DC converters 150, the power switching part 160 may perform a switching operation such that the received voltage is first transmitted to the submodule controller 170. In this case, which converter of the plurality of DC-DC converters 150 first transmits a voltage to the submodule controller 170 may be set to be prioritized. Of course, it is natural that a transmission priority for the plurality of devices 150, 180, and 190 may be changed.

The optic power supply 190 may supply a voltage to the power switching part 160 through an optical power cable as an example. Such an optical power cable may include a known optical fiber cable.

Figure 3:
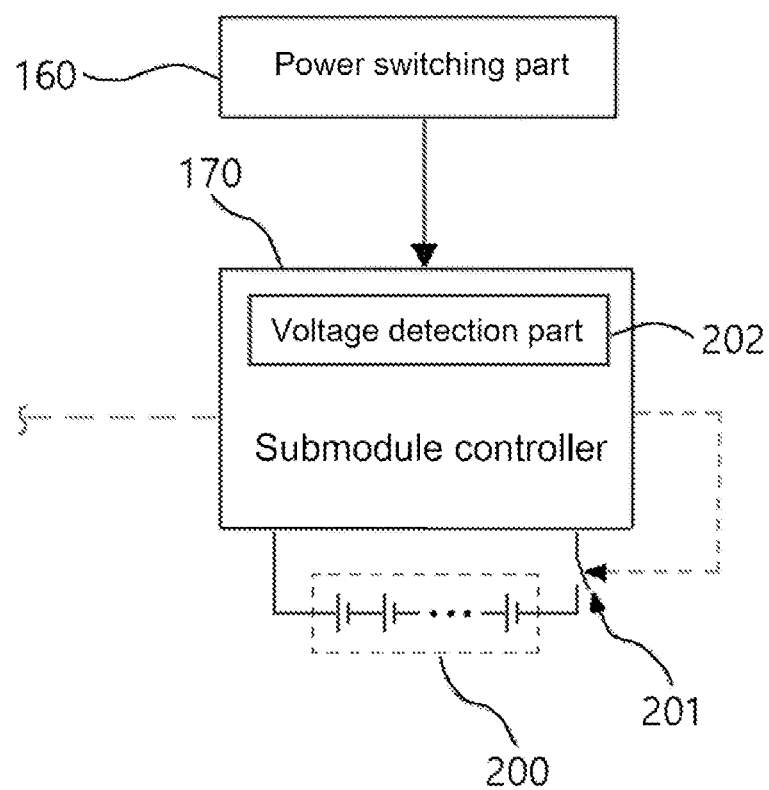
FIG. 3 is a configuration diagram of a submodule of an MMC converter according to another embodiment of the present disclosure.

FIG. 3 is a configuration diagram of the submodule of an MMC converter according to the another embodiment of the present disclosure.

Referring to FIG. 3, in the submodule 100 according to the another embodiment of the present disclosure, at least one charging cell 200 may be connected to the submodule controller 170. The charging cell 200 and the submodule controller 170 may be connected to each other by a charging cell switch 201. A voltage detection part 202 may be provided in the submodule controller 170.

When a voltage applied to the submodule controller 170 is less than a preset reference voltage, such a charging cell 200 may supply a voltage to the submodule controller 170.

Specifically, the submodule controller 170 may be operated by receiving a voltage supplied from the plurality of devices 150, 180, and 190. To operate the submodule controller 170, the supplied voltage is required to be at least a voltage required for the operation of the submodule controller 170. However, when the supplied voltage is less than the operating voltage for the submodule controller due to some causes, the submodule controller 170 may not be operated. To prevent this, when the supplied voltage is less than a preset operating voltage for the submodule controller, a voltage of the charging cell 200 may be supplied to the submodule controller 170 such that the operating voltage required for the submodule controller 170 can constantly be met.

Accordingly, in the present disclosure, even if a voltage supplied from the plurality of devices 150, 180, and 190 does not reach the operating voltage of the submodule controller 170, a voltage charged in the charging cell 200 may be supplied to the submodule controller 170 such that a constant voltage required for operating the submodule controller 170 can be maintained.

The voltage detection part 202 may detect a voltage supplied from the power switching part 160 to the submodule controller 170. Accordingly, when the voltage supplied to the submodule controller 170 is less than a voltage required for the submodule controller 170, the charging cell switch 201 connected to the charging cell 200 may be turned on such that the voltage of the charging cell 200 is supplied to the submodule controller 170.

In this case, in the another embodiment, the charging cell switch 201 may be set to be constantly turned on. That is, in this case, a voltage may be continuously supplied to the submodule controller 170 from the charging cell 200. Preferably, the voltage of the charging cell 200 may be supplied to the submodule controller 170 only when the voltage supplied to the submodule controller 170 is less than the operating voltage.

As described above, according to the submodule 100 of an MMC converter according to the present disclosure, the power switching part 160 located in the submodule 100 may selectively transmit one of voltages supplied from multiple devices to the submodule controller 170, so the selected voltage may be used as a voltage required for the operation of the submodule controller 170. Accordingly, even if any one device malfunctions, a voltage may be stably supplied to the submodule controller 170. Furthermore, even if a voltage is not applied to the submodule 100 prior to the operation of the MMC converter system, the submodule 100 may receive a voltage from the outside, so even before the operation of the submodule 100, the submodule 100 may be monitored in advance.

In addition, even if a voltage less than the operating voltage is applied to the submodule controller 170 due to the malfunction of the MMC converter system, the charging cell 200 may be used so as to additionally supply a voltage to the submodule controller 170, so a stable voltage supply may be performed.

Although the present disclosure described above has been described in detail through the exemplary embodiments, it is to be noted that the present disclosure is not limited to the contents of these embodiments. It is evident that those skilled in the art to which the present disclosure pertains may make various modifications or variations within the scope of the appended claims although not presented in the embodiments, all of which fall within the technical scope of the present disclosure. Accordingly, the true technical protection scope of the present disclosure should be determined by the technical spirit of the appended claims.

The invention claimed is:

1. A submodule of an MMC converter, the submodule comprising:
    an energy storage part for storing electric energy therein;
    a plurality of switching elements connected in parallel to the energy storage part to have a half-bridge or a full-bridge;
    a plurality of serially-connected resistors connected in parallel to the energy storage part;
    a plurality of DC-DC converters connected in parallel to a resistor of the plurality of resistors, converting a voltage divided by the resistors and outputting the voltage;

a power switching part for operating to select and output one voltage of voltages output from the plurality of DC-DC converters and a plurality of voltages input from outside;

a submodule controller for operating with the voltage output by the power switching part so as to control switching operations of the plurality of switching elements;

one or more charging cells connected to the submodule controller; and a charging cell switch connecting the charging cells to the submodule controller, wherein the submodule controller comprises a voltage detection part detecting the voltage supplied from the power switching part to the submodule controller, and wherein when the voltage detected by the voltage detection part is less than a preset voltage, the submodule controller turns on the charging cell switch such that a voltage charged in the charging cells is supplied to the submodule controller.

2. The submodule of claim 1, wherein the power switching part selects one voltage of the voltages output from the plurality of DC-DC converters and the plurality of voltages input from the outside according to a preset priority and outputs the selected voltage to the submodule controller.

3. The submodule of claim 1, wherein one DC-DC converter of the plurality of DC-DC converters is selected and a voltage output from the selected DC-DC converter is output to the power switching part.

4. The submodule of claim 3, wherein after checking the voltages of the plurality of DC-DC converters, one DC-DC converter having a voltage closest to a voltage required for the submodule controller is selected, and the voltage of the selected DC-DC converter is output to the power switching part.

\* \* \* \* \*